United States Patent [19]

Cofield et al.

[11] Patent Number: 5,047,778

[45] Date of Patent: Sep. 10, 1991

[54] FMCW RADAR RANGE TRACKER AND METHOD

[75] Inventors: David H. Cofield; John A. Moren, both of Seattle, Wash.

[73] Assignee: The Boeing Company, Seattle, Wash.

[21] Appl. No.: 596,865

[22] Filed: Oct. 11, 1990

[51] Int. Cl.$^5$ .................... G01S 13/34; G01S 13/70
[52] U.S. Cl. .................................. 342/97; 342/101; 342/122; 342/128
[58] Field of Search ............... 342/97, 101, 122, 128, 342/95, 98, 99

[56] References Cited

U.S. PATENT DOCUMENTS

| | | | |
|---|---|---|---|
| 2,776,424 | 1/1957 | Lair et al. | 342/59 |
| 3,108,273 | 10/1963 | Erst | 342/128 |
| 3,218,641 | 11/1965 | Maynard | 342/101 |
| 3,249,935 | 5/1966 | Follen | 342/97 |
| 3,739,379 | 6/1973 | Davis | 342/95 X |
| 4,008,475 | 2/1977 | Johnson | 342/128 X |
| 4,079,376 | 3/1978 | Kirk, Jr. | 342/93 |
| 4,136,341 | 1/1979 | Mulder et al. | 342/160 |
| 4,236,140 | 11/1980 | Aker et al. | 342/115 |
| 4,292,637 | 9/1981 | Johnson | 342/44 |
| 4,307,398 | 12/1981 | Ward, Jr. | 342/128 X |
| 4,367,473 | 1/1983 | Marin et al. | 342/87 |
| 4,427,981 | 1/1984 | Kyriakos | 342/122 |
| 4,435,709 | 3/1984 | Kipp | 342/101 |
| 4,509,049 | 4/1985 | Haendel et al. | 342/87 |
| 4,599,618 | 7/1986 | Haendel et al. | 342/122 X |
| 4,665,401 | 5/1987 | Garrard et al. | 342/75 |
| 4,743,907 | 5/1988 | Gellekink | 342/59 |

FOREIGN PATENT DOCUMENTS 685625 1/1953 United Kingdom .

Primary Examiner—Gilberto Barrón, Jr.
Attorney, Agent, or Firm—Christensen, O'Connor, Johnson & Kindness

[57] ABSTRACT

A range tracking technique for producing a ground return signal in an FMCW radar system. The radar system produces an IF signal having frequencies within a range extent band, the IF signal including a ground return component having frequencies in a narrower ground return band. The range tracker includes a tracking system, a search system, and a controller. The tracking system receives the IF signal and a track control signal, and bandpass filters the IF signal to produce the ground return signal. The search system also receives the IF signal, together with a search control signal from the controller. The search system includes a second bandpass filter for bandpass filtering the IF signal to produce a band power signal. The controller receives and stores samples of the band power signal, and identifies the ground return component. The location of the ground return is used to adjust the track control signal, to keep the first passband centered on the ground return.

10 Claims, 3 Drawing Sheets

FMCW RADAR RANGE TRACKER AND METHOD

FIELD OF THE INVENTION

The present invention relates to FMCW radar systems.

BACKGROUND OF THE INVENTION

In an FMCW radar system, the transmitter produces a transmitted signal having a frequency that varies linearly with time. The transmitted signal is derived from a voltage controlled oscillator (VCO), and the input signal to the VCO is controlled to produce the linear frequency sweep. The return signal from a target is mixed with the transmitted signal to produce an intermediate frequency (IF) signal having a frequency equal to the difference between the instantaneous frequency of the transmitted signal and the frequency of the return signal. Because the frequency of the transmitted signal changes linearly with time, the frequency of the IF signal is a function of target range.

In one important class of applications, an FMCW radar system is mounted in an aircraft and scans the ground at a location ahead of the aircraft. In such a system, it is necessary to isolate and analyze the "ground return," i.e., the energy reflected from the ground at the spot on which the radar beam is focused. Analysis of the ground return provides the range to the scanned spot on the ground. In addition, the ground return may be analyzed to identify radar signatures of particular objects or types of objects within the illuminated spot.

In order to isolate the ground return, the IF signal produced by the FMCW radar is input to a "range tracker" that is essentially a signal bandwidth limiter. The range tracker takes the IF signal having a large bandwidth (or range extent), and isolates and tracks the smaller bandwidth ground return portion of the signal. The bandwidth of the IF signal must be limited because the subsequent processing stages, i.e., the stages that search for particular radar signatures, have input bandwidth limitations that are much less than the bandwidth of the IF signal. For example, at typical altitudes and look down angles, a typical airborne FMCW radar system may produce a ground return that is approximately 1-3 MHz wide. This band of frequencies can exist anywhere between the range limits of the radar, which may for example be 1-100 MHz. Thus the ground return typically occupies only about 3% of the bandwidth of the IF signal.

Prior range trackers have generally been of two types: power sensors, or past history systems. Power sensors track the band of frequencies with the highest power return, which band is assumed to be the ground return. Temporary loss of signal strength means the system must search the range extent over which the radar operates, and reacquire the target. Generally, a time delay is applied such that the search and acquire is not initiated instantly upon loss of the ground return. Thus using power sensors, there can be a significant blind period during which the radar does not know the location of the ground return.

Past history systems offer a more elegant solution than power sensors. A past history system relies on the recent history of the radar return signal, and complex prediction techniques, to fill in short signal dropouts. Such systems are effective, but very complex, and require large amounts of data storage in order to accumulate past history information. There is therefore a need for an FMCW radar system that is less complex than a past history system, but that can reacquire the ground return more rapidly than power sensor systems.

SUMMARY OF THE INVENTION

The present invention provides an improved range tracking system and method for use in an FMCW radar system. Such a radar system produces an IF signal having frequencies within a range extent band. The IF signal includes a ground return component having frequencies in a ground return band that is within the range extent band.

The range tracking system is designed to produce a ground return signal from the IF signal, and includes a tracking system, a search system, and a controller. The tracking system is connected to receive the IF signal and a track control signal, and includes a first bandpass filter for bandpass filtering the IF signal to produce the ground return signal. The first bandpass filter has a first passband, and means for adjusting the first passband center frequency in accordance with the track control signal. The search system is also connected to receive the IF signal, together with a search control signal. The search system comprises a second bandpass filter for bandpass filtering the IF signal to produce a band power signal. The second bandpass filter has a second passband, and means for adjusting the second passband center frequency in accordance with the search control signal.

The controller includes means for receiving the band power signal from the search system, and means for producing the track and search control signals. The controller varies the search control signal such that the search system scans frequencies within the range extent band. As such scanning occurs, the controller stores samples of the band power signal. The stored samples are processed to identify the ground return band, and the track control signal is varied so as to vary the first passband center frequency, such that the first passband tracks the ground return band.

DETAILED DESCRIPTION OF THE INVENTION

Figure 1:
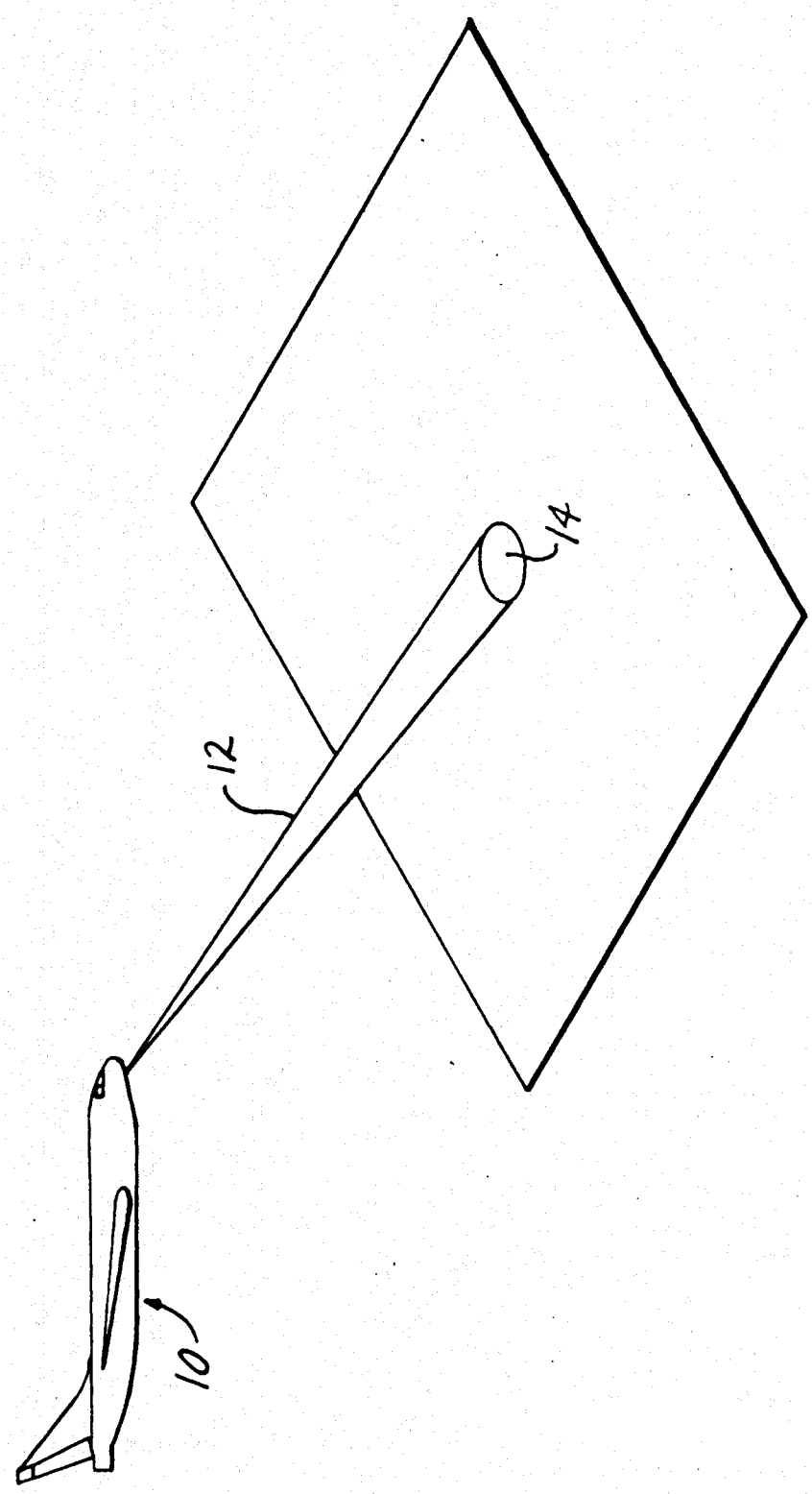
FIG. 1 is a schematic perspective view of an aircraft with a ground scanning radar system.
Figure 2:
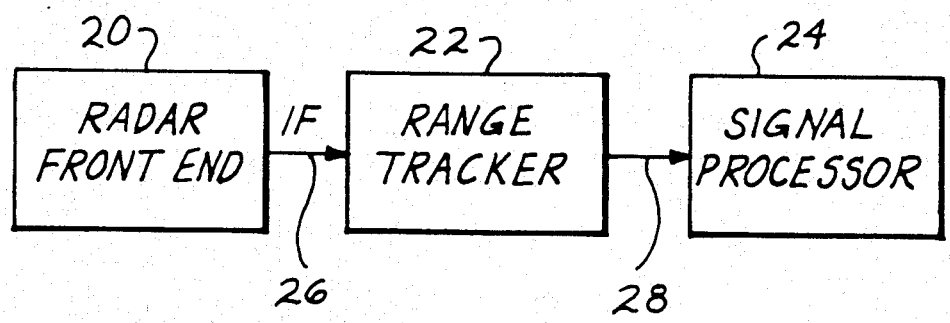
FIG. 2 is a block diagram of a FMCW radar system.

Referring to FIGS. 1 and 2, the FMCW radar system in which the present invention is used in commonly mounted in an aircraft 10. The radar system produces a focused radar beam 12 that illuminates a spot 14 on the ground over which the aircraft is flying. As shown in FIG. 2, the basic components of the radar system are radar front end 20, range tracker 22 and signal processor 24. Radar front end 20 includes an antenna for transmitting and receiving radar signals, and produces an IF signal on line 26. The IF signal has components at frequencies that correspond to the ranges of targets swept by the radar beam.

The IF signal is received by range tracker 22. The range tracker can be thought of as a variable, narrow bandpass filter. The center frequency of the passband of the bandpass filter is adjusted so that range tracker 22 passes the ground return portion of the IF signal, but attenuates other frequency components. The range tracker thereby produces a relatively narrow bandwidth ground return signal on line 28 that is received by signal processor 24. The signal processor analyzes the ground return signal, for example, to identify particular objects on the ground at the spot 14 scanned by the radar beam. Typically, ground returns have bandwidths of 1-3 MHz, depending upon the type of radar used and the depression angle of the radar. If the depression angle is small, then the antenna footprint covers a rather oblong patch of ground, and the width of the ground return in terms of frequency is relatively large. In general, the more the radar is pointing straight down at the ground (large depression angle), the narrower the bandwidth of the ground return.

Figure 3:
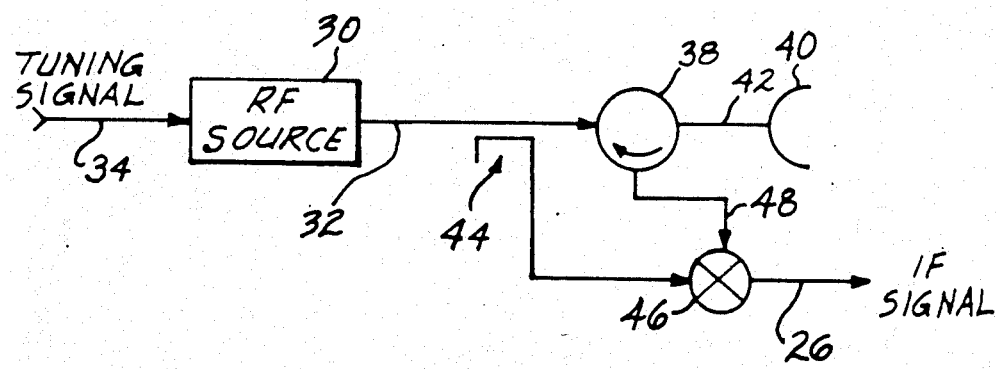
FIG. 3 is a schematic diagram of a radar front end.
Figure 4:
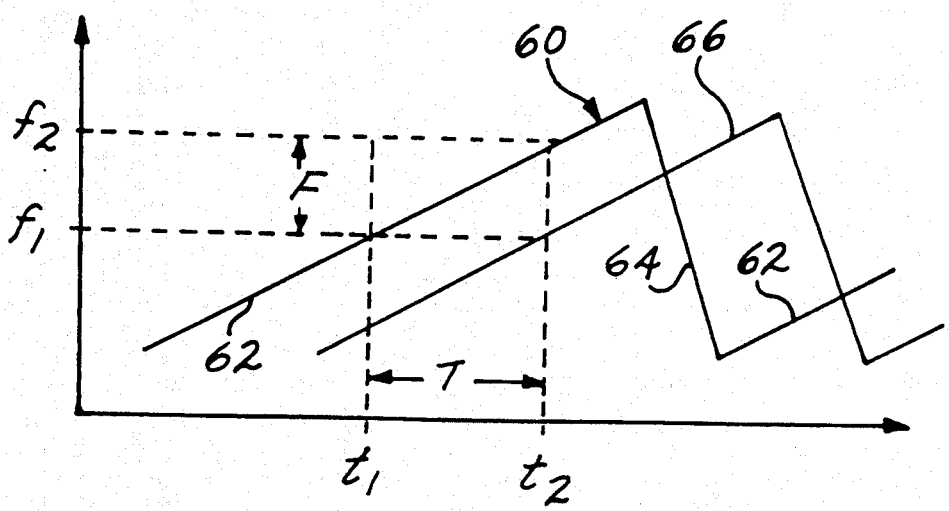
FIG. 4 is a graph illustrating the relationship between the range and frequency difference for an FMCW radar system.

FIGS. 3 and 4 illustrate the general principles of operation of an FMCW radar system, and in particular of front end 20. The front end comprises an RF source 30 having an output terminal connected to line 32 and an input terminal connected to line 34. RF source 30 produces an output signal on line 32 having a frequency determined by the voltage of a tuning signal on line 34. The output signal is fed to a transmit/receive system that comprises circulator 38, antenna 40, directional coupler 44 and mixer 46. The output signal from the RF source on line 32 is input to circulator 38 and directed by the circulator to antenna 40 via line 42. A sample of the output signal on line 32 is picked off by directional coupler 44 and input to one terminal of mixer 46. A return signal from a target passes through antenna 40, line 42, circulator 38, and the circulator passes the return signal to a second terminal of mixer 46 via line 48. Mixer 46 produces the IF signal on line 26 having a frequency equal to the difference between the instantaneous frequencies of the output signal on line 32 and the return signal. The IF signal is input to range tracker 22, as shown in FIG. 2.

In the operation of the system shown in FIG. 3, the tuning signal on line 34 is caused to sweep over a prescribed voltage range, such that the frequency of the output signal on line 32 sweeps through a prescribed frequency range. The frequency of the output signal is schematically illustrated by graph 60 in FIG. 4. Graph 60 comprises sweep portions 62 and retrace portions 64. Assuming that there is a target at a fixed range from antenna 40, the return from such a target is illustrated by graph 66 in FIG. 4. If the time required for a radar signal to make a round trip from the antenna to the target and back to the antenna is designated by T, then the radar signal transmitted at time $t_1$ at frequency $f_1$ will return to the radar system at time $t_2$, where $t_2$ is equal to $t_1 + T$. At time $t_2$, the return signal at frequency $f_1$ will be mixed with the instantaneous value of the transmitted signal at frequency $f_2$, and mixer 46 will produce a difference signal at frequency F. If sweep portion 62 is linear, then difference frequency F will be an accurate measure of time T, and therefore of the range to the target.

Figure 5:
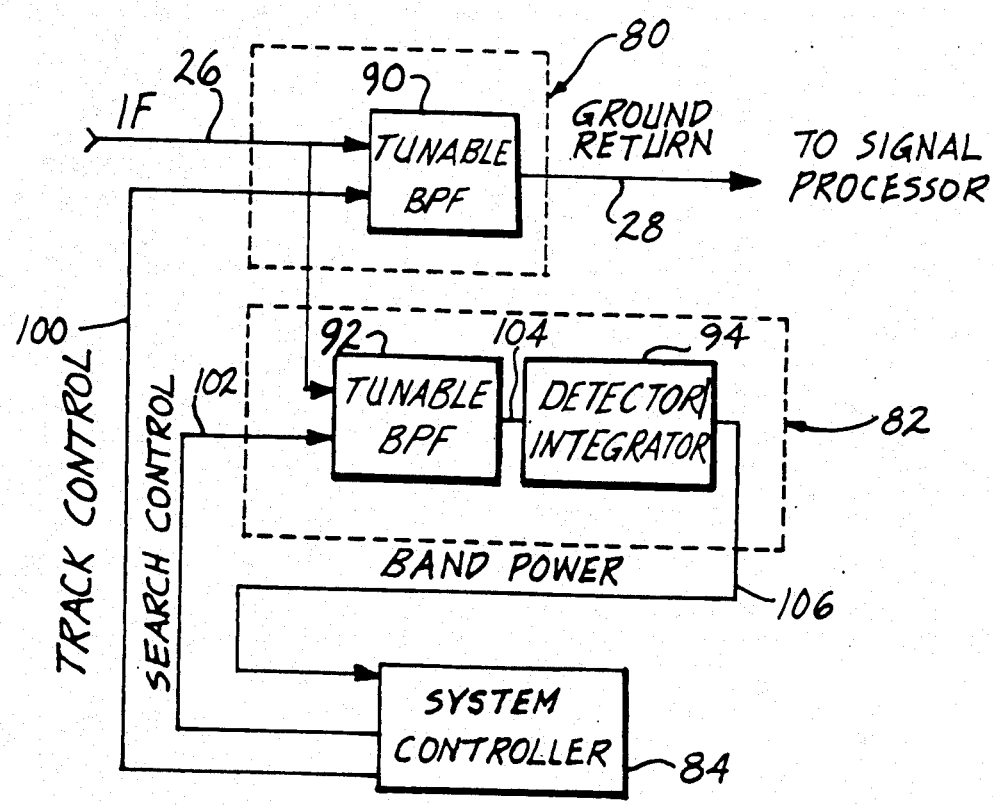
FIG. 5 is a block diagram of the range tracker of the present invention.

FIG. 5 presents a block diagram of a preferred embodiment of the range tracker of the present invention. The range tracker comprises tracking system 80, search system 82, and system controller 84. Tracking system 80 comprises tunable bandpass filter (BPF) 90. Generally, a tunable bandpass filter is a circuit that receives an input signal at its input terminal, and bandpass filters the input signal to produce an output signal at an output terminal, the center frequency of the passband of the filter varying in accordance with a control signal received at a control terminal. Bandpass filter 90 is connected to receive the IF signal on line 26 at its input terminal, and to produce the ground return signal on line 28 from its output terminal. At its control terminal, bandpass filter 90 receives a track control signal 100 from controller 84, as described below.

Search system 82 comprises tunable bandpass filter 92 and detector/integrator 94. Tunable bandpass filter 92 receives the IF signal at its input terminal, receives a search control signal on line 102 at its control terminal, and produces a filtered output signal on line 104 from its output terminal. The output signal is detected and integrated by block 94, and the resulting band power signal on line 106 is received by system controller 84.

In operation, assume that the system is tracking a ground return at a particular range. System controller 84 provides a track control signal at a voltage such that the passband of bandpass filter 90 is centered on the ground return. However at the same time, the system controller varies the voltage of the search control signal, such that bandpass filter 92 scans through a range extent frequency band that, at a minimum, exceeds and includes the ground return and. In one preferred embodiment, the system controller causes bandpass filter 92 to scan through the entire range extent of the radar system, i.e., from the lowest range to the highest range at which the radar system is designed to operate. Alternatively, specified subranges may be searched, depending upon the information available as to the probable location of the ground return band. Samples of the resulting band power signal, i.e., the output of block 94, are then passed back to the system controller via line 106. The system controller stores samples of the band power signal, preferably for at least one complete frequency scan through the range extent band of the radar. The search system 82 in effect samples the entire frequency spectrum within which the ground return could occur.

Preferably, the width of the passband of tunable bandpass filter 90 is substantially larger than that of tunable bandpass filter 92. In addition, the passband center frequency of filter 92 is preferably varied in increments that are approximately equal to the width of the passband, such that the entire range extent band of frequencies is samples. In one preferred embodiment, filter 90 has a 3 MHz passband, and filter 92 has a 1 MHz passband and has its passband center frequency varied in 1 MHz increments by the search control signal on line 102. The amount of variation of the passband center frequency between successive samples in effect establishes the resolution of the search system.

System controller 84 processes the stored range profile (i.e., the samples of the band power signal) produced by search system 82, to select the ground return from the range profile. This extraction process can use any of the conventional algorithms for identifying the ground return, such as power, range extent, past history, etc. Once the ground return is identified, the system controller adjusts the track control signal on line 100, if necessary, in order to keep the passband of bandpass filter 90 centered about the ground return. Thus the search function of the range tracker is continuous, and separate from the tracking function. The search system may operate by obtaining a full spectrum of the radar system's range extent, and then analyzing such spectrum to identify the ground return. Alternately, the analysis to identify the ground return could be performed more or less frequently, depending upon the particular application of the radar system.

Assume now that the aircraft flies over the edge of a ridge or the like, such that the range of the ground return suddenly changes. At the instant that the radar beam passes the ridge, bandpass filter 90 no longer produces a valid ground return signal, since its passband is now centered on a range different from that of the actual ground return. Search system 82, however, continues to sweep in range. As soon as one complete sweep is completed after the loss of the ground return, system controller 84 will have acquired a complete frequency spectrum of the IF signal for the full radar and width, i.e., for the full range extent of the radar. The ground return can then be selected from such spectrum by conventional techniques, such as thresholding. As soon as the ground return is located, system controller provides a new track control signal on line 100, such that the passband center frequency of bandpass filter 90 is again centered over the ground return range. Preferably, at any time that the ground return cannot be identified by the search system, the value of the track control signal is frozen or kept constant, until the ground return is reacquired.

The advantages of the described invention include the fact that the range tracker tracks and searches at the same time, since there are two channels used. Therefore, once the hardware for the system is assembled, it does not need to be modified in order to change the tracking algorithm, since the tracking algorithm is realized in software within system controller 84. In addition, the track system is updated from near real time data, and data storage requirements are thus an order of magnitude less than those for track-while-scan systems.

While the preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. A range tracking apparatus for producing a ground return signal in an FMCW radar system, the radar system comprising means for producing an IF signal having frequencies within a range extent band, the IF signal including a ground return component having frequencies in a ground return band within the range extent band, the range tracking apparatus comprising:
    a tracking system connected to receive the IF signal and a track control signal, the tracking system including a first bandpass filter for bandpass filtering the IF signal to produce the ground return signal, the first band pass filter having a first passband having a first passband center frequency and a first passband width, and means for adjusting the first passband center frequency in accordance with the track control signal;
    a search system connected to receive the IF signal and a search control signal, the search system comprising a second bandpass filter for filtering the IF signal to produce a band power signal, the second bandpass filter having a second passband having a second passband center frequency and a second passband width, and means for adjusting the second passband center frequency in accordance with the search control signal; and
    a controller including means for receiving the band power signal from the search system, and means for producing the track control signal and the search control signal, the controller including means for varying the search control signal such that the search system scans frequencies within the range extent band, means for storing samples of the band power signal, means for processing said stored samples to identify the ground return band, and means for varying the track control signal so as to vary the first passband center frequency such that the first passband tracks the ground return band.

2. The apparatus of claim 1, wherein the ground return band is substantially narrower than the range extent band.

3. The apparatus of claim 1, wherein the first passband width is greater than the second passband width.

4. The apparatus of claim 1, wherein the search control signal is varied such that between successive samples of the band power signal, the second passband center frequency varies by an amount approximately equal to the second passband width.

5. The apparatus of claim 1, wherein the means for varying the search control signal causes the search system to scan substantially the entire range extent band.

6. The apparatus of claim 1, wherein the means for storing includes means for storing samples of the band power signal for at least one complete scan through the frequencies of the range extent band.

7. A method for producing a ground return signal in an FMCW radar system, the radar system comprising means for producing an IF signal having frequencies within a range extent band, the IF signal including a ground return component having frequencies in a ground return band within the range extent band, the method comprising:
    bandpass filtering the IF signal using a first bandpass filter to produce the ground return signal, the first bandpass filter having a first passband having a first passband center frequency and a first passband width, and means for adjusting the first passband center frequency in accordance with a track control signal;
    bandpass filtering the IF signal using a second bandpass filter to produce a band power signal, the second bandpass filter having a second passband having a second passband center frequency and a second passband width, and means for adjusting the second passband center frequency in accordance with a search control signal;
    varying the search control signal such that the second bandpass filter scans frequencies within the range extent band;
    storing samples of the band power signal;
    processing the stored samples to identify the ground return band; and
    varying the track control signal so as to vary the first passband center frequency such that the first passband tracks the ground return band.

8. The method of claim 7, wherein the search control signal is varied such that between successive samples of the band power signal, the second passband center frequency varies by an amount approximately equal to the second passband width.

9. The method of claim 7, wherein the search control signal is varied so as to cause the second bandpass filter to scan substantially the entire range extent band.

10. The method of claim 7, wherein the storing step comprises storing samples of the band power signal for at least one complete scan through the range extent band.

* * * * *